US010319106B2

United States Patent
Liu et al.

(10) Patent No.: US 10,319,106 B2
(45) Date of Patent: Jun. 11, 2019

(54) METHOD FOR PROCESSING MULTIPLE IMAGE SOURCES

(71) Applicant: Chin-Min Liu, Zhubei (TW)

(72) Inventors: Chin-Min Liu, Zhubei (TW); Hsueh-Chih Liu, Zhubei (TW); Yu-Tung Liu, Taipei (TW); Pei-Yu Liu, Taipei (TW)

(73) Assignee: Chin-Min Liu, Zhubei (TW)

( * ) Notice: Subject to any disclaimer, the term of this patent is extended or adjusted under 35 U.S.C. 154(b) by 61 days.

(21) Appl. No.: 15/700,452

(22) Filed: Sep. 11, 2017

(65) Prior Publication Data

US 2019/0080465 A1    Mar. 14, 2019

(51) Int. Cl.
*G06T 7/62* (2017.01)
*G06T 11/00* (2006.01)
*G06T 7/00* (2017.01)
*G06T 13/80* (2011.01)

(52) U.S. Cl.
CPC .......... *G06T 7/62* (2017.01); *G06T 7/97* (2017.01); *G06T 11/00* (2013.01); *G06T 13/80* (2013.01); *G06T 2213/12* (2013.01)

(58) Field of Classification Search
None
See application file for complete search history.

(56) References Cited

U.S. PATENT DOCUMENTS

2004/0141658 A1* 7/2004 Haas ................. G06F 17/30247
382/278
2010/0310182 A1* 12/2010 Kroepfl .............. G06K 9/00624
382/216

* cited by examiner

*Primary Examiner* — Matthew C Bella
*Assistant Examiner* — Brian D Shin
(74) *Attorney, Agent, or Firm* — Rosenberg, Klein & Lee

(57) ABSTRACT

A method for processing multiple image sources comprises steps: receiving a plurality of first images from a first device; arranging the first images in an order of times of capturing the first images; receiving at least one second image from at least one second device; arranging together the second image and the most spatially neighboring first images according to first and second positioning information of the first and second images; arranging the first and second images sharing an identical geographic space into an identical geographic group; arranging the first and second images, which have an identical still background, into an identical background group; sorting the first and second images of each background group in an order from a large background to a small background or in a reverse order; and processing the sorted images into a video. The present invention makes viewers watching the video feel smooth without abruptness.

15 Claims, 7 Drawing Sheets

METHOD FOR PROCESSING MULTIPLE IMAGE SOURCES

BACKGROUND OF THE INVENTION

Field of the Invention

The present invention relates to an image data processing method, particularly to a method for processing multiple image sources, which can integrate the images inside a plurality of devices into an image collection movie, whereby the viewers can view the collected images fluently without abruptness.

Description of the Related Art

With advance of science and technology, many electronic products are equipped with cameras. At present, almost all mobile communication devices have the built-in camera and the positioning service function. Therefore, every traveler can use the device at hand to capture the images of persons and landscapes in his travels to keep memories of travels.

The user can retrieve and edit the recorded images. For example, the user can use an application program to arrange and edit the images recorded in his travels and integrate the recorded images into a movie as the memories of the travels. In addition to editing the images of a single camera device, the user can also load the images of several camera devices into an identical device to integrate the images captured by many persons, whereby the viewers can enjoy abundant and diversiform pictures. At present, most application programs can only arrange the images in the sequence of dates and times at which the images are captured. However, while images are arranged according to dates and times, the different backgrounds of the former images and the latter images may lead to inconsistency of pictures and make the viewers feel abrupt.

In addition to the application programs arranging images according to dates and times, some application programs arrange images according to positioning information, such as the positioning information provided by the Global Positioning System (GPS), the BeiDou Navigation Satellite System of PRC, the GLONASS System of Russia, or the Galileo Plan of EU, wherein the images include photographs and videos (motion pictures). The photographs contain Exchangeable Image File Format (EXIF) information. If the positioning service is turned on in photographing, EXIF information will include positioning information. However, videos are free of EXIF information and thus short of positioning information. Therefore, the user cannot arrange videos according to positioning information. In such a case, the user may set the positioning information of a representative photograph of a plurality of photographs of the video or use the positioning information of the camera device recording the video at that time to arrange the photographs and videos according to positions. While the user arranges the images captured by an identical camera device according to positioning information, the arranged images should not make viewers feel abrupt. Different positioning measurement errors may exist in different camera devices. Therefore, while the arranged images are captured by a plurality of camera devices, identical positioning, information may be related with photographs having different backgrounds or landscapes. Besides, different lenses, such as standard lenses and zoom lenses, may also make the photographs of identical positioning information have different backgrounds or landscapes. The professional monocular cameras manufactured before lack positioning function. The user has to look up in a map for positioning information, such as the GPS information, and then adds the positioning information to photographs. Even though the user arranges photographs according to positioning information, different positioning measurement errors of different camera devices may make the photographs having the same background be arranged discontinuously. Thus, the movie of the integrated photographs lacks sufficient continuity. Further, the dramatic change of the backgrounds generates afterimages and makes viewers feel the image collection movie inconsistent.

In order to make the arranged images have continuity, most users choose to sort images manually. However, manual sorting is very time-consuming. For example, manually processing the image data of all the members of a tour group is exactly a big job.

It is very important in the age where network communities prevail: to integrate the images, which the members of a tour group captured in a tour, into a tour documentary shared by all the members of the tour group to enhance the interaction among the members. Therefore, an improved the technology for producing tour documentaries is eagerly expected by the users.

Accordingly, the present invention proposes a method for processing multiple image sources to overcome the abovementioned problems.

SUMMARY OF THE INVENTION

The primary objective of the present invention is to provide a method for processing multiple image sources, which can integrate the images stored in a plurality of devices and sorts the images according to locations or still backgrounds. Sorting images according to still backgrounds can decrease the influence of different positioning measurement errors of different camera devices and improve the continuity of playing the integrated video. During playing the integrated video, the present invention further gradually rotates the pictures according to the angular difference between the present image and the next image lest the viewers feel swayed while the images are shifted. The present invention further adjusts the time of playing individual images according to the proportion of a still object in the present image to the proportion of the identical still object in the next image, whereby to diversify the time intervals of playing individual images. The present invention further provides an image display route axis in the video to convenience the user to select the images he intends to view according to the tour sites.

In order to achieve the abovementioned objective, the present invention proposes a method for processing multiple image sources, which comprises steps: receiving a plurality of first images, time information of each first image and first positioning information of each first image from a first device; arranging the plurality of first images in the order of the times at which the first images were captured according to the time information; receiving at least one second image and second positioning information of the second image from at least one second device; arranging together the second image and the most spatially neighboring first images according to the second positioning information of the second image and the first positioning information of each first information; undertaking a subtraction of the first positioning information of the first image and the second positioning information of the neighboring second image or the first positioning information of the neighboring first image to generate distance information, and arranging the first image or the second image into an identical geographic group while the distance information of the first image or second image is less than a preset distance; comparing the still backgrounds of the first images and the second images of each geographic group, and arranging the first images and the second images, which have an identical still background, into an identical background group; sorting the first images and second images of each background group in an order from a large background to a small background or in an order from a small background to a large background.

Below, embodiments are described in detail to make easily understood the objectives, technical contents, characteristics and accomplishments of the present invention.

DETAILED DESCRIPTION OF THE INVENTION

Figure 1:
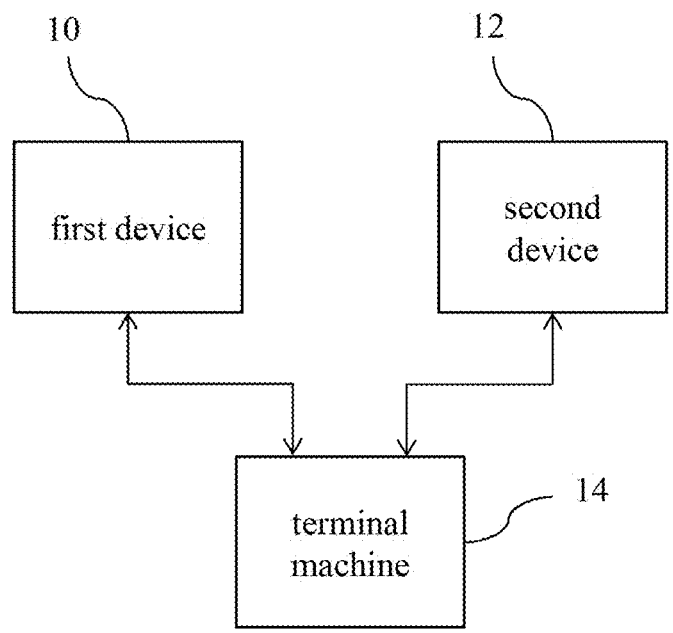
FIG. 1 is a block diagram schematically showing a system used by the present invention.

Refer to FIG. 1. Firstly, the system used by the present invention is described below. The system used by the present invention comprises a first device 10, a second device 12, and a terminal machine 14. The first device 10 is an electronic device that can link to a network to upload or download images and can also play motion pictures, such as a smart mobile communication device, a smart phone, or a computer. In one embodiment, a smart phone capable of shooting photographs, recording motion pictures and positioning is used to exemplify the first device 10. The first device 10 can capture pictures to generate a first image. In this embodiment, the first image may be a photograph or a motion picture; while capturing a first image, the first device 10 also acquires information of the time at which the first image is captured (time information) and information of the position where the first image is captured (first positioning information). The first positioning information is provided by the Global Positioning System (GPS), the BeiDou Navigation Satellite System of PRC, the GLONASS System of Russia, or the Galileo Plan of EU. If the user does not turn on the positioning function of the first device 10 and thus cannot acquire the first positioning information, he can manually input the first positioning information to define the position of each first image. In the present invention, the second device 12 may be a single second device 12 or a plurality of second devices 12. In this embodiment, the present invention uses a single second device 12. The second device 12 is an electronic device that can link to a network to upload or download images and can also play motion pictures. Similar to the first device 10, the second device 12 is a smart mobile device capable of shooting photographs, recording motion pictures and positioning, such as a smart phone or a computer. The second device 12 can capture pictures to generate a second image. The second device 12 can also acquire information of the position where the second image is captured (second positioning information). The second positioning information is provided by the Global Positioning System (GPS), the BeiDou Navigation Satellite System of PRC, the GLONASS System of Russia, or the Galileo Plan of EU. If the second device 12 cannot acquire the second positioning information, the user can manually input the second positioning information to define the position of each second image. The first image and the second image contain Exchangeable Image File Format (EXIF) information. If the positioning service is turned on in photographing, EXIF information will include positioning information. However, videos (motion pictures) are free of EXIF information and thus short of positioning information. Therefore, the user cannot arrange videos together with photographs according to positioning information. In such a case, the user may use the positioning information of a representative photograph of a plurality of photographs of the video or the positioning information of the camera device recording the video at that time to arrange the photographs and videos.

The terminal machine 14 is a computer able to process information. In this embodiment, the terminal machine 14 is a cloud computer. The terminal machine 14 is in signal communication with the first device 10 and the second device 12 and receives information from the first device 10 and the second device 10 through a network. The terminal machine 14 arranges the first images and the second images in order according to the time information of the first device 10 and the second device 12, the first positioning information of the first device 10, and the second positioning information of the second device 12. The terminal machine 14 fabricates the arranged first images and second images into a video. The first device 10, the second device 12, and other devices able to link to a network can link to the terminal machine 14 through the network to view the video. Besides, the terminal machine 14 can be used by the first device 10 and the second device 12 to edit individual images, e.g. adding text to the video or dubbing a background music for the video. The edition activities can also enhance the interaction of the community.

Figure 2:
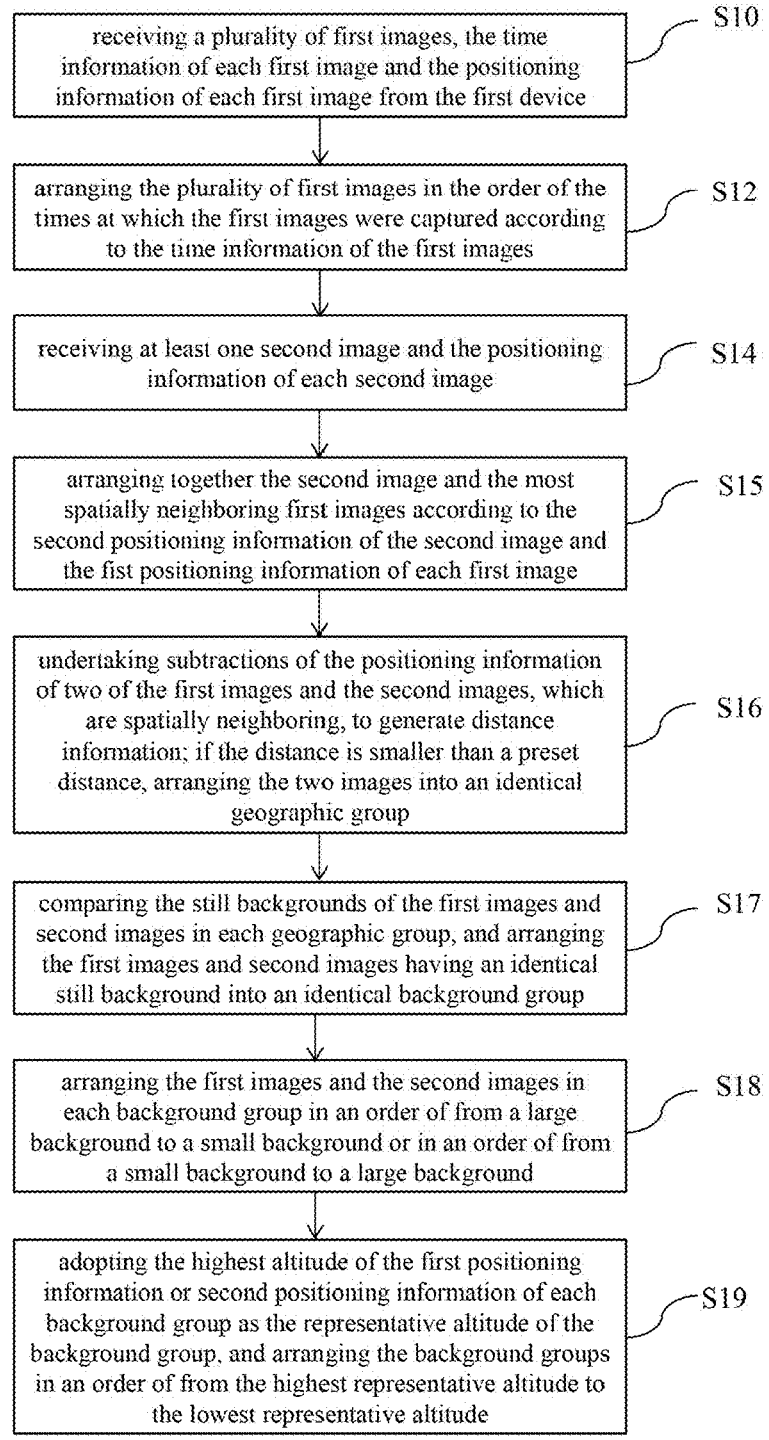
FIG. 2 is a flowchart of a process of arranging images in order according to one embodiment of the present invention.
Figure 3:
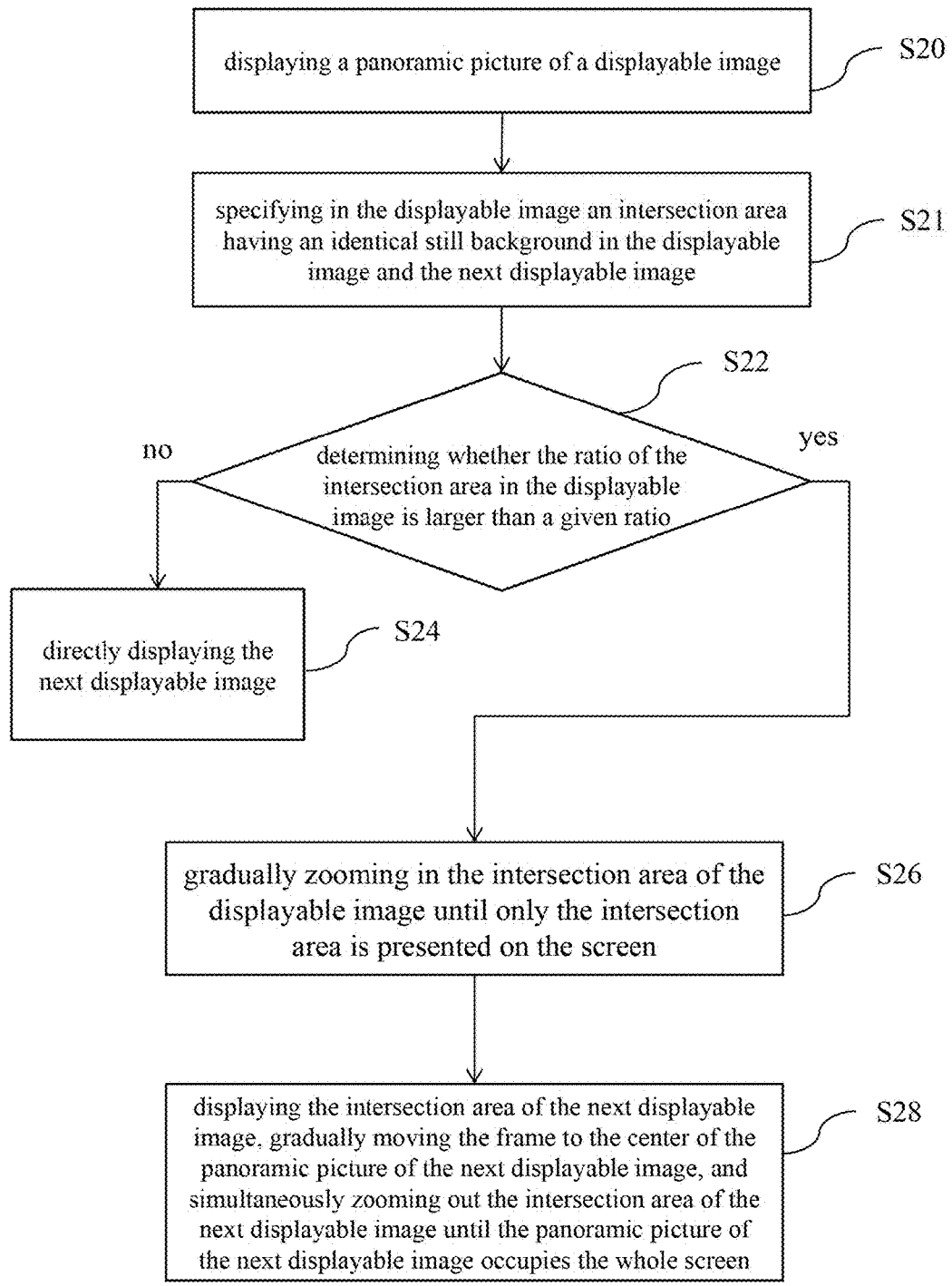
FIG. 3 is a flowchart of a process of displaying a video according to one embodiment of the present invention.

The architecture of the system used by the present invention has been described above. The method of the present invention will be described below. Refer to FIG. 1 and FIG. 2. FIG. 2 is a flowchart of a process of arranging images according to one embodiment of the present invention. In Step S10, the terminal machine 14 receives a plurality of first images, the time information of each first image and the positioning information of each first image from the first device 10; while receiving the first images, the terminal machine 14 also checks the first images; while the first image is unclear, e.g. the first image is blurred or out of focus, or while the person in the first image has a grimace, e.g. the person closes his eyes, shows the whites of his eyes, or has a distorted face, the terminal machine 14 would delete the first images of the abovementioned problems lest these images be stored in the terminal machine 14. In Step S12, the terminal machine 14 arranges the plurality of first images in the order of the times at which the first images were captured according to the time information of the first images; the terminal machine 14 arranges the first image captured firstly in the frontmost position and the other first images in the order of the times at which these first images were captured; the terminal machine 14 defines the location where the frontmost first image was captured as the start point and the location where the hindermost first image was captured as the end point.

After the terminal machine 14 arranges the first images according to the time sequence, the process proceeds to Step S14. In Step S14, the terminal machine 14 receives at least one second image from the second device 12. In this embodiment, the terminal machine 14 receives a plurality of second images and positioning information of each second image from the second device 12. At the same time, the terminal machine 14 also checks the second images. While the second image is unclear, e.g. the second image is blurred or out of focus, or while the person in the second image has a grimace, e.g. the person closes his eyes, shows the whites of his eyes, or has a distorted face, the terminal machine 14 would delete the second images of the abovementioned problems lest these images be stored in the terminal machine 14. The locations of capturing the first images that have been arranged according to the time information forms a time-based image capturing path. After receiving the second images, the terminal machine 14 compares the second positioning information of each second image with the time-based image capturing path of the first images to determine whether the distance between the location of capturing the second image and the time information-based image capturing path is larger than a preset value. If the distance is larger than the preset value, the terminal machine 14 deletes the second image lest the outlier image be stored in the terminal machine 14, whereby to prevent viewers from feeling abrupt while the locations of the adjacent displayed images are separated by a significant distance.

In Step S15, the terminal machine 14 arranges together the second image and the most spatially neighboring first images, i.e. the first images separated from the second image by a shortest distance, according to the second positioning information of the second image and the first positioning information of each first image. In Step S16, the terminal machine 14 arranges the first images and the second images sharing an identical geographic space into an identical geographic group according to a plurality pieces of first positioning information of the first images and a plurality of pieces of second positioning information of the second images. In arranging the first images and the second images into an identical geographic group, the terminal machine 14 undertakes subtractions of two of the plurality of pieces of the first positioning information of the first images and the plurality of pieces of the second positioning information of the second images to generate distance information; if the distance is smaller than a preset distance, the two images belong to an identical geographic group. In deter mining the abovementioned preset distance, because landscapes of open and vast fields look alike, the preset distance of an open and vast field, such as a grassland, is normally larger than or equal to the preset distance of a street in a town. For example, the preset distance of the Grand Canyon National Park in Arizona is 1000 m and the preset distance of the downtown of San Francisco in California is 500 m.

After the first images and the second images are assigned to different geographic groups, the process proceeds to Step S17. In Step S17, the terminal machine 14 compares the still backgrounds of the first images and second images in each geographic group and arranges the first images and second images having an identical still background into an identical background group. The still background may be an object, a building, a texture, or a landscape. The landscape may be a road, a lake, a mountain, an electric pole, or a significant landmark. Then, the process proceeds to Step S18. In Step S18, the terminal machine 14 arranges the first images and the second images in each background group in an order of from a large background to a small background, or in an order of from a small background to a large background. In this embodiment, the order is from a large background to a small background. The terminal machine 14 determines whether the background is a small or large background according to the number of still objects in the background of the image. The background having more still objects is a large background, and the background having fewer still objects is a small background.

Then, the process proceeds to Step S19. In Step S19, the terminal machine 14 adopts the highest altitude of the first positioning information or second positioning information of each background group as the representative altitude of the background group. The terminal machine 14 further arranges the background groups in an order of from the highest representative altitude to the lowest representative altitude. If two background groups have an identical representative altitude, the terminal machine 14 adopts the earliest time information of each background group as the representative time of the background group and then arranges the two background groups according to the representative times of the two background groups. Generally to speak, the higher the altitude, the more the still objects in the background. For example, an aerial photo should have more still objects in the background. Therefore, arranging the background groups in order according to the altitudes can enhance the effect of sorting images. Thus, the method of the present invention can improve the continuity and consistency of the arranged images.

Figure 4A:
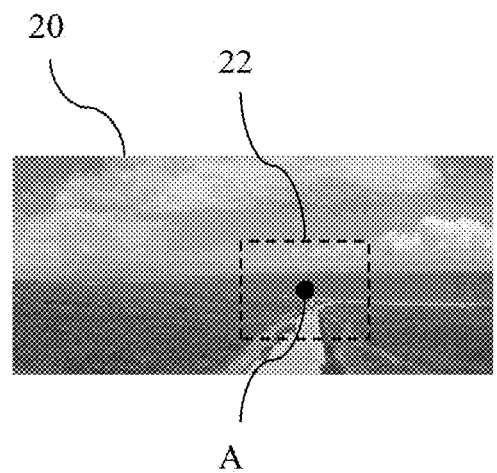
FIGS. 4A-4D are diagrams schematically showing steps of displaying images according to one embodiment of the present invention.
Figure 4B:
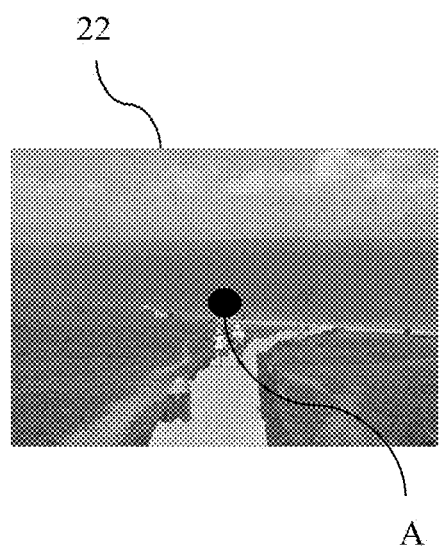

After arranging the first images and the second images in order according to the abovementioned method, the terminal machine 14 can further edit the arranged first images and second images into a plurality of displayable images to form a displayable video. Refer to FIG. 1, FIG. 3, FIGS. 4A-4D, and FIG. 5. Below is explained the displaying method of the present invention. In Step S20, the terminal machine 14 provides a panoramic picture of a displayable image 20 and displays the panoramic picture on the screen of the first device 10 or the second device 12. Refer to FIG. 4A. In Step S21, the terminal machine 14 specifies an intersection area 22 of the displayable image 20 and the next displayable image, in the displayable image 20. No matter whether in the displayable image 20 or the next displayable image, the intersection area 22 has an identical still background. In Step S22, the terminal machine 14 determines whether the ratio of the intersection area 22 in the displayable image 20 is larger than a given ratio. When the ratio of the intersection area 22 is not larger than the given ratio, the process proceeds to Step S24. In Step S24, the terminal machine 14 directly displays the next displayable image 22' after displaying the displayable image 20. When the ratio of the intersection area 22 is larger than the given ratio, the process proceeds to Step S26. Refer to FIG. 4A and FIG. 5. In Step S26, the terminal machine 14 gradually zooms in the intersection area 22 of the displayable image 20 until only the intersection area 22 is presented. In this step, the terminal machine 14 adjusts the intersection area 22 of the displayable image 20 and the displayed area of the intersection area 22' of the next displayable image 20' to match the height-to-width ratio of the screen; then, the terminal machine 14 moves a center A of the intersection area 22 of the displayable image 20 to the center of the screen. In other words, the terminal machine 14 adjusts the intersection area 22 until the intersection area 22 fully occupies the screen, as shown in FIG. 4B. The smaller the ratio of the intersection area 22 of the displayable image 20, the longer the time has elapsed before the center of the intersection area 22 is moved to the center of the screen. Besides, the ratio of the intersection area 22 in the displayable image 20 may be used to determine the ratio of gradually zooming in the intersection area 22 lest the intersection area 22 be over magnified to have poor resolution and image aliasing. FIG. 4B and FIG. 5. In zooming in the intersection area 22 of the displayable image 20, the intersection area 22 is magnified to such an extent that only the intersection area 22 appears in the screen. If the displayable image is displayed on the first device 10, the intersection area 22 will exactly match the height-to-width ratio of the screen of the first device 10 and fully occupy the screen of the first device 10. At the same time, the intersection area 22 is also rotated to an angle the same as the angle of the intersection area 22' of the next displayable image 20'.

Figure 4C:
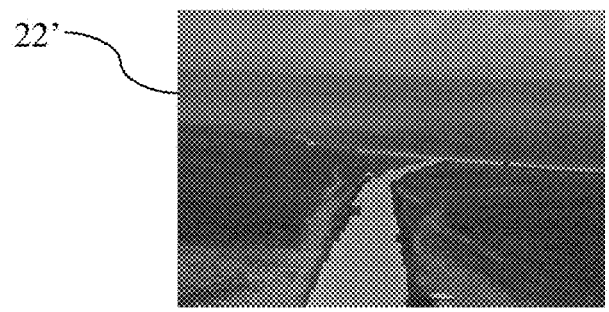
Figure 4D:
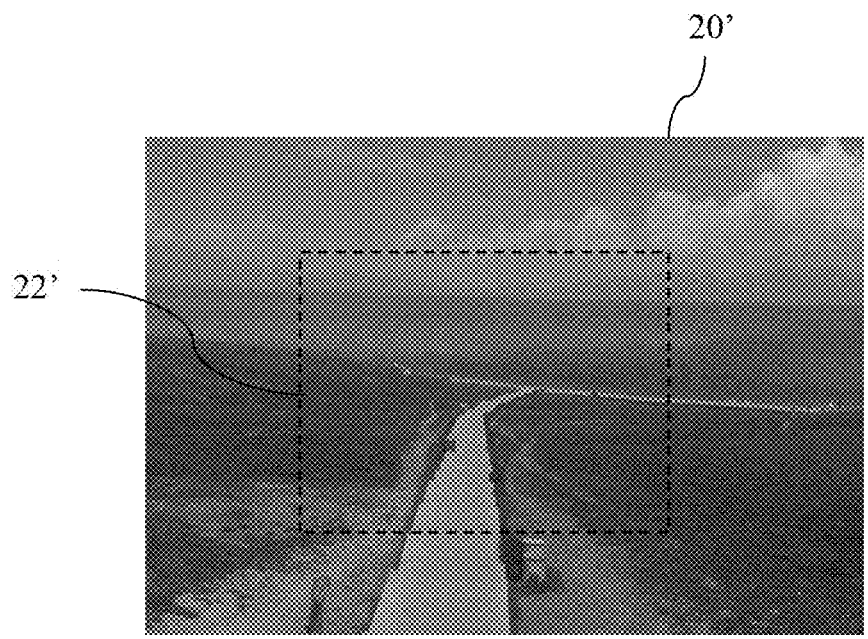
Figure 5:
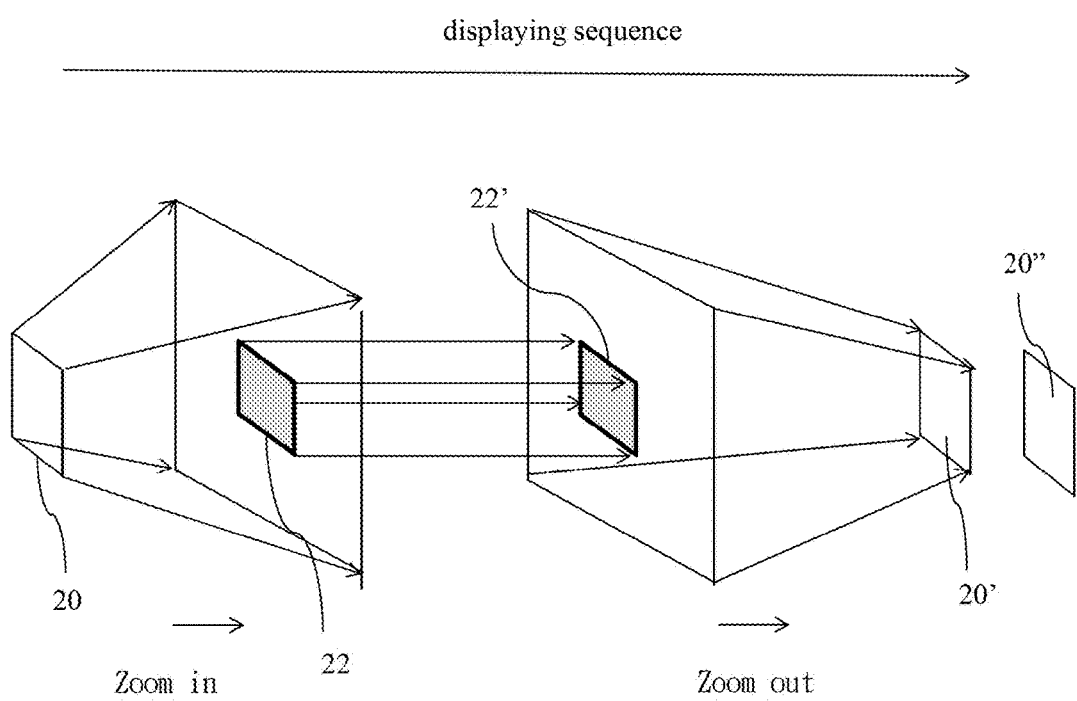
FIG. 5 is a diagram schematically showing that a frame is shifted from a displayable image to a next displayable image according to one embodiment of the present invention.

Refer to FIG. 4C and FIG. 5. In Step S28, the terminal machine 14 shifts the frame to the intersection area 22' of the next displayable image 20' and then gradually moves the frame to the center of the panoramic picture of the next displayable image 20'. In the abovementioned process, the terminal machine 14 simultaneously zooms out the intersection area 22' of the next displayable image 20' until the panoramic picture of the next displayable image 20' occupies the whole screen. Then, the terminal machine 14 displays the further next displayable image 20". The method of displaying the further next displayable image 20" is the same as that described above and will not repeat herein. The smaller the ratio of the intersection area 22' in the displayable image 20', the longer the time that has elapsed before the intersection area 22' is shifted into the panoramic picture. For example, while the ratio of the intersection area 22' in the displayable image 20' is 80%, the time that has elapsed before the intersection area 22' is shifted into the panoramic picture is 1.25 seconds; while the ratio of the intersection area 22' in the displayable image 20' is 90%, the time that has elapsed before the intersection area 22' is shifted into the panoramic picture is 1.11 seconds, which is relatively shorter than 1.25 seconds.

Figure 6:
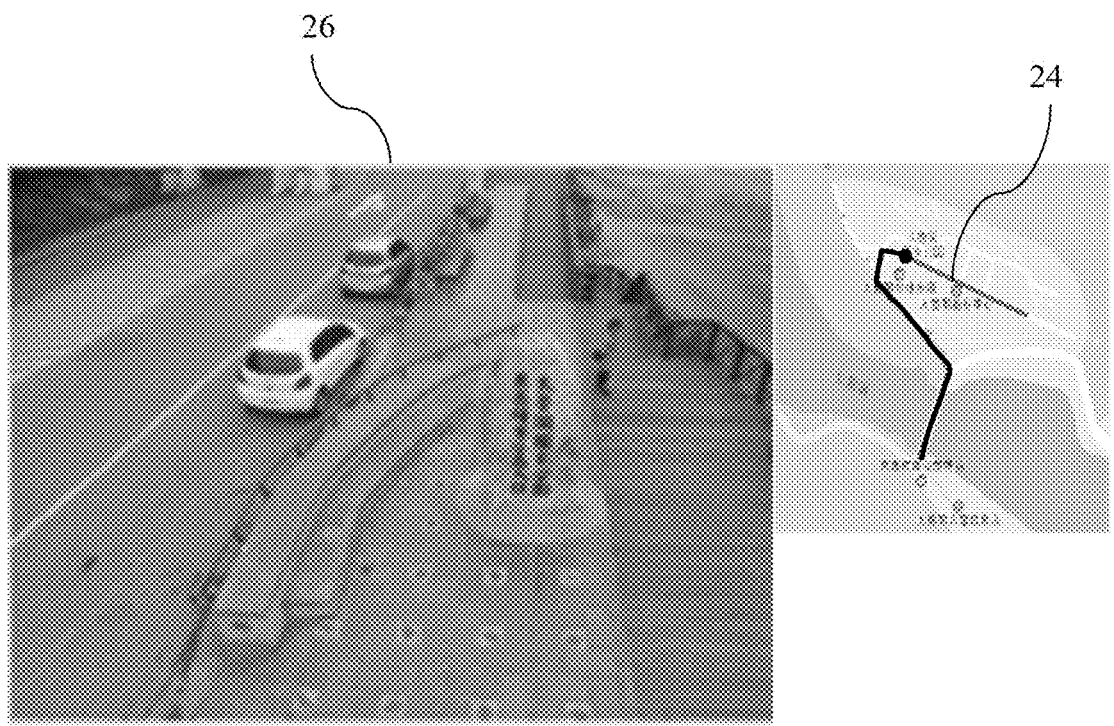
FIG. 6 is a diagram schematically showing a display interface having an image display route axis according to one embodiment of the present invention.

Refer to FIG. 6. In one embodiment, the terminal machine 14 further generates an image display route axis 24 in a displayable image 26. In one embodiment, the image display route axis 24 is similar to the progress bar in an ordinary displayed video. Alternatively, the image display route axis is presented beside the displayable image. While the user selects a site in the image display route axis 24, the displayable image corresponding to the selected site is displayed. The image display route axis 24 enables the user to learn the site where the currently-displayed image is captured and favors the members of the network community to easily learn the site where the image is captured. The image display route axis 24 is a movement path formed via sorting the second positioning information and the first positioning information. The present invention uses a regression analysis method, such as a least square method, a moving average method, or a maximum likelihood method, to smooth the first positioning information and the second positioning information of the same geographic group, whereby the curve of the movement path of the geographic group is smoothed to be less rugged. Thereby, the user can operate the image display route axis 24 more easily.

In conclusion, the present invention integrates images of multiple devices and sorts the images according to the positioning information and the still background of each image. Sorting, images according to still backgrounds can reduce the influence of the positioning measurement errors of the camera devices, enhance the continuity in playing video, and decrease the afterimages caused by changing backgrounds. The present invention adjusts the angle and playing time of images according to the angles of the current displayable image and the next displayable image and the ratio of the intersection area in the displayable image, whereby two succeeding images having angular difference would not make viewers feel abrupt, and whereby the playing time is diversified. Further, the present invention provides an image display route axis in the played video to convenience the user to select the images he desires to view according to tour sites.

The present invention has been demonstrated with embodiments above. However, these embodiments are only to exemplify the present invention but not to limit the scope of the present invention. Any equivalent modification or variation according to the characteristics or spirit of the present invention is to be also included by the scope of the present invention.

What is claimed is:
1. A method for processing multiple image sources, comprising steps:
at a terminal machine electrically connected to a first device and at least one second device:
receiving a plurality of first images, time information of each said first image and first positioning information of each said first image from the first device;
arranging said first images in an order of times at which said first images were captured according to said time information;
receiving at least one second image and second positioning information of said second image from the at least one second device;
arranging together said second image and said first images most spatially neighboring said second image according to said second positioning information of said second image and said first positioning information of each said first image;
undertaking a subtraction of said first positioning information of one said first image and said second positioning information of said second image neighboring said first image or said first positioning information of another said image neighboring said first image to generate distance information; while said distance information of another said first image or said second image is less than a preset distance, arranging another said first images or said second image into an identical geographic group;
comparing still backgrounds of said first images and said second images of each said geographic group, and arranging said first images and said second images, which have an identical still background, into an identical background group;
sorting said first images and said second images of each said background group in an order from a large background to a small background or in an order from a small background to a large background; and
processing said first images and said second images, which have been arranged in order, into a plurality of displayable images to form a displayable video.
2. The method for processing multiple image sources according to claim 1, wherein after said step of receiving said second images, said second positioning information of each said second image is compared with a time information-based image capturing path of said first images to determine whether a distance between a location of capturing said second image and said time information-based image capturing path is larger than a preset value; if said distance is larger than said preset value, said second image is deleted.

3. The method for processing multiple image sources according to claim 1 further comprising a step: adopting a highest altitude of said first positioning information or said second positioning information of each said background group as a representative altitude of said background group, and arranging said background groups in an order of from a highest one to a lowest one of said representative altitudes; if two said background groups have an identical said representative altitude, adopting an earliest time information of each said background group as a representative time of said background group, and arranging said two background groups in an order of said representative times of said two background groups.

4. The method for processing multiple image sources according to claim 1, wherein said still background is an object, a building, a texture, or a landscape.

5. The method for processing multiple image sources according to claim 1, wherein a method of playing said displayable video comprises steps:
presenting a panoramic picture of one said displayable image;
specifying an intersection area of said displayable image and a next displayable image, wherein said intersection area has an identical said still background in said displayable image and said next displayable image;
determining whether a ratio of said intersection area in said displayable image is larger than a given ratio;
when said ratio is not larger than said given ratio, directly displaying said next displayable image;
when said ratio is larger than said given ratio, undertaking a next step;
gradually zooming in said intersection area of said displayable image until only said intersection area is presented; and
presenting said intersection area of said next displayable image; during moving to a center of a panoramic picture of said next displayable image, gradually zooming out said intersection area of said next displayable image until only said panoramic picture of said next displayable image is presented.

6. The method for processing multiple image sources according to claim 5, wherein before moving to a center of said intersection area of said displayable image, adjusting a displayed area of said intersection area of said displayable image and a displayed area of said intersection area of said next displayable image to match a height-to-width ratio of a screen.

7. The method for processing multiple image sources according to claim 5, wherein the smaller said ratio of said intersection area in said displayable image, the longer an interval of time has elapsed before only said intersection area is presented.

8. The method for processing multiple image sources according to claim 5, wherein the smaller said ratio of said intersection area in said next displayable image, the longer an interval of time has elapsed before said panoramic picture of said next displayable image is fully presented.

9. The method for processing multiple image sources according to claim 5, wherein in said step of gradually zooming in said intersection area of said displayable image until only said intersection area is presented, an angle of said intersection area is adjusted to match an angle of said intersection area of said next displayable image.

10. The method for processing multiple image sources according to claim 1 further comprising a step of generating an image display route axis in said displayable video while playing said displayable video, wherein while a site of said image display route axis is selected, said displayable images corresponding to said site are displayed, and wherein said image display route axis is a movement path generated according to said first positioning information and said second positioning information of said displayable images in sequence.

11. The method for processing multiple image sources according to claim 10, wherein said image display route axis is a movement path generated via sorting said first positioning information and said second positioning information of said displayable images in sequence, and wherein a regression analysis method is used to smooth said first positioning information and said second positioning information of an identical said geographic group to generate a smooth curve of said movement path.

12. The method for processing multiple image sources according to claim 1 further comprising a step: after said step of receiving said first images, deleting said first images that are unclear.

13. The method for processing multiple image sources according to claim 1 further comprising a step: after said step of receiving said second images, deleting said second images that are unclear.

14. The method for processing multiple image sources according to claim 1, wherein said first positioning information and said second positioning information is provided by the Global Positioning System (GPS), the BeiDou Navigation Satellite System of PRC, or the Galileo Plan of EU.

15. The method for processing multiple image sources according to claim 1, wherein either of said first image and said second image may be a photograph or a video, and wherein while said first image or said second image is a video, one of a plurality of photographs of said video is selected as a representative photograph, and wherein positioning information of said representative photograph is used as positioning information of said video.

* * * * *